Patented Oct. 18, 1949

2,485,097

UNITED STATES PATENT OFFICE 2,485,097

RUBBER TACKIFIED WITH ACYLATED PHENOL-ALDEHYDE RESIN

Louis H. Howland, Watertown, Conn., and Lyndon B. Tewksbury, Jr., Potsdam, N. Y., assignors to United States Rubber Company, New York, N. Y., a corporation of New Jersey No Drawing. Application October 3, 1946, Serial No. 701,057

6 Claims. (Cl. 260—3)

This invention relates to the treatment of rubber and similar materials whereby to increase the building tack thereof.

An object of this invention is to confer on rubber and synthetic rubber greater building tack than the rubbers inherently possess by the addition of certain acylated synthetic resins. The rubbers to be improved by the new tackifiers include natural rubber, guayule, balata, and synthetic rubbers, such as the rubbery butadiene-styrene copolymers (GR-S rubber), the rubbery butadiene-acrylonitrile copolymers (GR-A rubber), polychloroprene (GR-M rubber), polyisoprene, and the rubbery isobutylene-conjugated diolefin copolymers (GR-I rubber).

This invention is particularly concerned with the tackifying of the GR-S type rubbers, since experience has shown that this material is deficient in tack compared to natural rubber.

We have found that the oxygen-acyl derivatives of certain oil-soluble phenolic-aldehyde resins are excellent tackifiers as aforesaid. By the term "acyl" is meant any carbonyl-containing group which is derived from a carboxylic acid of the aliphatic, cyclo-aliphatic, or aromatic series. Representative of such groups are acetyl, propionyl, butyryl, benzoyl, furoyl, lauroyl, phenyl acetyl, acrylyl, crotonyl, chloracetyl, and chloropropionyl. The term "oil-soluble" is a term frequently used in resin literature to indicate solubility in such solvents as toluene, turpentine, or linseed oil. By the term "phenolic" is meant a hydrocarbon-substituted phenol having at least two unsubstituted positions, oriented ortho, or ortho and para, to the hydroxyl group. The term "hydrocarbon" refers to such groups as methyl, ethyl, isopropyl, allyl, tertiary-butyl, tertiary-amyl, diisobutyl, cyclohexyl, phenyl, benzyl, etc. There may be more than one such latter group per phenol molecule as long as the above conditions as to the number of unoccupied positions are fulfilled. Mixtures of phenols may also be used to give resins that can be acylated to form tackifiers, as illustrated by the acetyl derivative of a mixed polymer formed from p-tert-butyl phenol, p-tert-amyl phenol and acetaldehyde. The term "aldehyde" includes both aliphatic and aromatic aldehydes, such as formaldehyde, acetaldehyde, propionaldehyde, crotonaldehyde, benzaldehyde, butyraldehyde, etc.

More particularly, this invention is concerned with the use of oxygen-acyl derivatives of oil-soluble hydrocarbon-substituted phenol-acetaldehyde resins, of which the following are exemplary:

Acetyl p-tert-butyl phenol-acetaldehyde resin
n-Propionyl p-tert-butyl phenol-acetaldehyde resin
n-Butyryl p-sec-butyl phenol-acetaldehyde resin
n-Lauroyl p-isobutyl phenol-acetaldehyde resin
Benzoyl p-tert-butyl phenol-acetaldehyde resin
Crotonyl o-tert-butyl phenol-acetaldehyde resin
Furoyl p-tert-butyl phenol-acetaldehyde resin
Acetyl p-tert amyl phenol-acetaldehyde resin
n-Butyryl p-tert-amyl phenol-acetaldehyde resin
Acetyl p-tert-butyl phenol-formaldehyde resin
n-Butyryl p-normal butyl phenol-formaldehyde resin
Acetyl o-cyclohexyl phenol-acetaldehyde resin
n-Propionyl p-diisobutyl phenol-formaldehyde resin
Crotonyl p-tert-butyl phenol-formaldehyde resin
Acetyl p-isopropyl phenol-butyraldehyde resin
Acetyl p-tert-butyl phenol-benzaldehyde resin
Acetyl p-tert-butyl phenol-p-tert-amyl phenol-acetaldehyde resin
Acetyl p-diisobutyl phenol-p-isopropyl phenol formaldehyde resin
Acetyl p-isobutyl phenol-p-cresol formaldehyde resin Using the acetyl derivative of p-tert butyl phenol-acetaldehyde resin as an illustration, the chemicals are believed to have the following probable general structure:

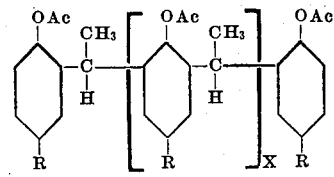

where R is the tertiary butyl group; Ac is the acetyl group (CH₃—CO—); and X is the number of polymer units in the p-tert butyl phenol-acetaldehyde resin.

A convenient manner of using the tackifiers is to add them to the rubber batch on a warm mill or in a Banbury, in order to mix them homogeneously with the rubber mass. Preferably, the tackifier should be added early in the mixing cycle, such as during the breakdown or shortly thereafter, to permit its thorough incorporation before the rubber mix becomes softened due to milling or to the addition of softening oils. A particular advantage of the present tackifiers is that they do not retard the rate of cure of the compounded rubber as do the free phenolic resins.

The following examples illustrate the invention, the preparation of a resin used in the syntheses of various esters first being described and the parts being by weight:

*Preparation of p-tert-butyl phenol-acetaldehyde resin*

|  | Pounds |
|---|---|
| p-Tert.-butyl phenol | 185 |
| Concentrated hydrochloric acid | 37 |
| Oxalic acid crystals | 12.5 |
| Xylene | 50 |
| Paraldehyde | 109 |

The above materials are charged into a 75-gallon Pfaudler, glass-lined reactor and heated at 90–100° C. for 21 hours.

At the end of that period, 25 lbs. more xylene are added. The cooled solution is washed once with water, neutralized with sodium hydroxide and washed twice more with water. The xylene is distilled from the solution, the residue heated to 220° C. and poured into stainless steel trays where it is allowed to harden. The yield is 75% of the theoretical. The product has a ball-and-ring softening point of 145° C. Portions of this resin are used in the syntheses of various esters as described in the following examples.

*Example 1.—Acetyl p-tert-butyl phenol-acetaldehyde resin*

A mixture of 100 grams of p-tert-butyl phenol-acetaldehyde resin, prepared as described above, and 87.2 grams (1½ molar equivalents) of acetic anhydride are refluxed 2 hours, then let stand at room temperature overnight. The product mixture is taken up in solvent naphtha and the solution washed with water and sodium bicarbonate solution. The dried solution is subjected to distillation, first at atmospheric, then under reduced pressure. The bath temperature is taken up to 190° C./1 mm. The residual resin amounts to 83 grams and softens (in a capillary tube) at 92–104° C. The hydroxyl number of a sample is 109, indicating that 58.4% of the hydroxyls has been acetylated.

*Example 2.—Lauroyl p-tert-butyl phenol-acetaldehyde resin* p-Tert-butyl phenol-acetaldehyde resin, prepared as described above (71.3 grams, 0.4 mol), and 80 grams (0.4 mol) of lauric acid are dissolved in 200 cc. of m-diisopropyl benzene. The solution is refluxed in a 3-necked liter flask fitted with a Stark-Dean trap for removal of water. Refluxing for 7 hours at a liquid temperature of 210° produces only 1.8 cc. of water in the trap. The reaction mixture is therefore treated with 1 gram of boric acid and the refluxing continued for 22½ hours. In this way, 3.8 cc. more water is removed bringing the total to 5.6 cc. (Theory, for complete reaction, is 7.2 cc.)

The product mixture is subjected to distillation under high vacuum (1 mm.) in which process the vapor temperature reaches 130° C. Solvent and a little lauric acid are hereby removed.

The residue is a viscous oil amounting to 116 grams. Its hydroxyl number is 51, indicating that 72% of the hydroxyl groups in the parent phenolic resin has been lauroylated.

*Example 3.—Benzoyl p-tert-butyl phenol-acetaldehyde resin* p-Tert-butyl phenol-acetaldehyde resin (90 grams), prepared as described above, is dissolved in 295 cc. of anhydrous pyridine. Benzoyl chloride (81.5 cc., a 40% molar excess) is added slowly dropwise. The mixture is then heated on a steam bath for 5 hours. At the end of this period the pyridine hydrochloride is filtered and 100 cc. of pyridine distilled off. The residue, diluted with benzene, is washed several times with water and dried. Removal of the benzene in vacuo leaves a residue containing appreciable amounts of benzoic acid. To free of the latter, the product is taken up in benzene again and the solution extracted twice with 180 cc. quantities of 2 N sodium hydroxide. The solution is washed to neutrality with water and dried. The benzene is distilled off and the remaining volatile material removed by distillation under 1½ mm. pressure and at 180° C. oil-bath temperature. Yield of resin: 35 grams of material softening at 80–93° C. (in a capillary tube) plus 10 grams softening at 76–93° C. Hydroxyl number is 99, indicating 60% benzoylation.

*Example 4.—Rubber tack tests*

The tackifying strength in GR-S rubber of the new resins is tested in a standard tire carcass recipe, as follows:

| GR-S rubber | 100.0 |
|---|---|
| Semi re-inforcing furnace black | 33.0 |
| Stearic acid | 1.0 |
| Zinc oxide | 5.0 |
| Dibenzothiazyl disulfide (accelerator) | 0.75 |
| Hexamethylene-tetramine-ethyl chloride reaction product plus stearic acid (accelerator) | 0.50 |
|  | 140.25 |

The resins are milled into portions of the above stock on a hot mill (250–260° F.), the milling continuing for a total of 10 minutes. Then sulfur is added on a cool mill. Five finished stocks are compounded as follows:

|  | A | B | C | D | E |
|---|---|---|---|---|---|
| Above Compound | 140.25 | 140.25 | 140.25 | 140.25 | 140.25 |
| Resin (Ex. 1) |  | 10.0 |  |  |  |
| Resin (Ex. 2) |  |  |  | 10.0 |  |
| Resin (Ex. 3) |  |  |  |  | 10.0 |
| Sulfur | 3.0 | 3.0 | 3.0 | 3.0 | 3.0 |

The tack tests are run as follows: Each of the above compounds is skim-coated onto a strip of prepared fabric tape. Six-inch sections of the coated tape are laid face-to-face and rolled together under a 37-lb. weighted roller. The rolled strips are permitted to rest for the periods indicated in the table and then separated between the jaws of a Scott tensile testing machine. The "pull" is automatically recorded on a tensile sheet. The most constant portion of the curve thus produced is taken as the tack strength which is recorded in lbs./in. The above stocks give the following tack results:

| Stock | A | B | C | D | E |
|---|---|---|---|---|---|
| 3 days | 1.0 | 6.5 | 0.75 | 2.5 | 2.0 |

The higher figures indicate the greater tack; stock A is the control for stock B and stock C is the control for stocks D and E.

The proportions of the tackifier resin are not limited to those shown in the examples, but may range from about 2 to about 20 parts per 100 parts by weight of the given rubber.

As aforesaid, whereas the invention may be applied to any rubber, natural or synthetic, it has particular usefulness in those rubbers which are denoted as synthetic elastomers which are usable to replace natural rubber in its various uses, and especially those concerned with the elastomers referred to as rubbery copolymers of 1,3-butadiene-styrene.

Having thus described our invention, what we claim and desire to protect by Letters Patent is:

1. A rubber selected from the group consisting of natural rubber, guayule, balata, rubbery butadiene-styrene copolymers, rubbery butadiene-acrylonitrile copolymers, polychloroprene, polyisoprene, and rubbery isobutylene-conjugated diolefine copolymers, admixed with 2 to 20 percent by weight of said rubber of an acylated p-tertiary-butyl phenol-acetaldehyde resin in which a major proportion of the phenolic hydroxyl radicals are acylated by acyl radicals derived from an acid of the group consisting of unsubstituted aliphatic, aryl-aliphatic, chloro-aliphatic and aromatic mono-basic carboxylic acids.

2. A rubber selected from the group consisting of natural rubber, guayule, balata, rubbery butadiene-styrene copolymers, rubbery butadiene-acrylonitrile copolymers, polychloroprene, polyisoprene, and rubber isobutylene-conjugated diolefine copolymers, admixed with 2 to 20 percent by weight of said rubber of an acylated p-tertiary-butyl phenol-acetaldehyde resin in which a major proportion of the phenolic hydroxyl radicals are acetylated.

3. A rubber selected from the group consisting of natural rubber, guayule, balata, rubbery butadiene-styrene copolymers, rubbery butadiene-acrylonitrile copolymers, polychloroprene, polyisoprene, and rubbery isobutylene-conjugated diolefine copolymers, admixed with 2 to 20 percent by weight of said rubber of an acylated p-tertiary-butyl phenol-acetaldehyde resin in which a major proportion of the phenolic hydroxyl radicals are lauroylated.

4. A rubber selected from the group consisting of natural rubber, guayule, balata, rubbery butadiene-styrene copolymers, rubbery butadiene-acrylonitrile copolymers, polychloroprene, polyisoprene, and rubbery isobutylene-conjugated diolefine copolymers, admixed with 2 to 20 percent by weight of said rubber of an acylated p-tertiary-butyl phenol-acetaldehyde resin in which a major proportion of the phenolic hydroxyl radicals are benzoylated.

5. A rubbery butadiene-styrene copolymer admixed with 2 to 20 percent by weight of said rubber of an acylated p-tertiary-butyl phenol-acetaldehyde resin in which a major proportion of the phenolic hydroxyl radicals are acylated by acyl radicals derived from an acid of the group consisting of unsubstituted aliphatic, aryl-aliphatic, chloro-aliphatic and aromatic mono-basic carboxylic acids.

6. A rubbery butadiene-styrene copolymer admixed with 2 to 20 percent by weight of said rubber of an acylated p-tertiary-butyl phenol-acetaldehyde resin in which the hydrogens of a major proportion of the phenolic hydroxyl radicals are acetylated.

LOUIS H. HOWLAND.
LYNDON B. TEWKSBURY, Jr.

REFERENCES CITED

The following references are of record in the file of this patent:

UNITED STATES PATENTS

| Number | Name | Date |
|---|---|---|
| 1,697,713 | Bucherer | Jan. 1, 1929 |

FOREIGN PATENTS

| Number | Country | Date |
|---|---|---|
| 48,977 | France | June 28, 1938 |
| | (1st addition to 804,552) | |
| 567,096 | Great Britain | Jan. 29, 1945 |

OTHER REFERENCES

Van der Meer: pp. 853-856, 866-868, Rubber Chem. & Tech., 1945.